US012768278B2

(12) United States Patent
Alvanos et al.

(10) Patent No.: US 12,768,278 B2
(45) Date of Patent: Oct. 20, 2026

(54) FAN GUIDE VANE WITH LEADING EDGE DEICING

(71) Applicant: RTX Corporation, Farmington, CT (US)

(72) Inventors: Ioannis Alvanos, West Springfield, MA (US); David A. Welch, Quaker Hill, CT (US)

(73) Assignee: RTX Corporation, Farmington, CT (US)

( * ) Notice: Subject to any disclaimer, the term of this patent is extended or adjusted under 35 U.S.C. 154(b) by 59 days.

(21) Appl. No.: 18/765,549

(22) Filed: Jul. 8, 2024

(65) Prior Publication Data

US 2026/0009340 A1 Jan. 8, 2026

(51) Int. Cl.

| | |
|---|---|
| ***F01D 9/04*** | (2006.01) |
| ***F01D 5/18*** | (2006.01) |
| ***F01D 25/02*** | (2006.01) |
| ***F02K 3/06*** | (2006.01) |

(52) U.S. Cl.

CPC ............... *F01D 9/041* (2013.01); *F01D 5/18* (2013.01); *F01D 9/042* (2013.01); *F01D 25/02* (2013.01); *F02K 3/06* (2013.01); *F05D 2240/121* (2013.01); *F05D 2260/213* (2013.01)

(58) Field of Classification Search

CPC . F01D 9/041; F01D 9/042; F01D 5/18; F01D 25/02; F05D 2240/121; F05D 2260/213

See application file for complete search history.

(56) References Cited

U.S. PATENT DOCUMENTS 4,563,128 A * 1/1986 Rossmann .............. F01D 5/284 416/241 B
7,900,438 B2 3/2011 Venkataramani et al.
8,100,634 B2 * 1/2012 Evans ..................... F01D 9/042 415/115
8,616,834 B2 12/2013 Knight, III et al.
10,196,932 B2 2/2019 Sennoun
(Continued)

FOREIGN PATENT DOCUMENTS

EP 4198269 A1 6/2023
GB 2569695 A 6/2019

OTHER PUBLICATIONS

Extended European Search Report for counterpart EP Application No. 25187373.3 dated Oct. 30, 2025.

*Primary Examiner* — Brian P Wolcott

(74) *Attorney, Agent, or Firm* — Bachman & LaPointe, P.C.

(57) ABSTRACT

A fan exit guide vane with a load member and cooling cavity including an inner attachment region opposite an outer attachment region; a load member cavity formed within the fan exit guide vane extending spanwise through the fan exit guide vane from the inner attachment region to the outer attachment region; the load member extending through the load member cavity beyond each of the inner attachment region and the outer attachment region of the fan exit guide vane; a cooling cavity formed within the fan exit guide vane extending spanwise through the fan exit guide vane between the inner attachment region and the outer attachment region; and a leading edge deicing structure in fluid communication with the cooling cavity and the leading edge.

19 Claims, 10 Drawing Sheets

(56) References Cited

U.S. PATENT DOCUMENTS

| | | | | |
|---|---|---|---|---|
| 10,323,571 | B2 * | 6/2019 | Subramanian | F02C 7/047 |
| 10,392,952 | B2 * | 8/2019 | Zaccardi | F01D 9/065 |
| 10,436,050 | B2 | 10/2019 | Filipenco et al. | |
| 10,830,076 | B2 * | 11/2020 | Zaccardi | B22F 5/04 |
| 11,078,795 | B2 | 8/2021 | Jonnalagadda et al. | |
| 11,365,647 | B2 | 6/2022 | Marchaj | |
| 11,415,009 | B2 | 8/2022 | Sobanski et al. | |
| 11,566,564 | B2 | 1/2023 | Bifulco et al. | |
| 11,655,828 | B2 * | 5/2023 | Zheng | F04D 29/542<br>415/1 |
| 2005/0050877 | A1 | 3/2005 | Venkataramani et al. | |
| 2007/0068136 | A1 | 3/2007 | Cameriano et al. | |
| 2008/0159851 | A1 | 7/2008 | Moniz et al. | |
| 2019/0078452 | A1 * | 3/2019 | Zaccardi | F28F 3/025 |
| 2020/0032670 | A1 | 1/2020 | Morris et al. | |

* cited by examiner

FAN GUIDE VANE WITH LEADING EDGE DEICING

BACKGROUND

The present disclosure is directed to the improved fan exit guide vane with load carrying member and leading edge deicing.

Current gas turbine engine design, as seen in FIG. 1 through FIG. 4*a*, includes a design with variable and non-variable fan exit guide vanes (FEGV). The fan F is positioned within the fan duct FD proximate the engine inlet EI. The fan exit guide vanes (FEGV) are downstream from the fan F and located forward of the bypass duct BD.

A current FEGV pattern is created to minimize airflow back pressure adverse effect on fan blades F caused by the downstream presence of nacelle N bypass duct BD elements (FIG. 2), such as the upper and lower bifurcation BiFi, air-to-oil cooler cowl AOC, and environmental control system inlet ECS.

As seen in FIG. 3, the FEGV has a circumferential pattern CP made up of vanes V that can translate the structural load path LP shown as arrows in FIG. 4. But all vane types are designed with the same cross sectional monolithic load carrying features (FIG. 4*a*). Additionally, the FEGV pattern aims to optimize the fan duct performance and acoustic characteristics of the gas turbine engine.

Moreover cooling of engine systems and components is becoming more challenging as core sizes decrease and operating temperatures increase.

SUMMARY

In accordance with the present disclosure, there is provided a fan exit guide vane with load carrying member and leading edge deicing comprising a leading edge and a trailing edge opposite chordwise from the leading edge; a radially inner attachment region opposite spanwise from a radially outer attachment region; a span dimension extending between the radially inner attachment region and the radially outer attachment region; a chord dimension extending between the leading edge and the trailing edge; a pressure side opposite a suction side of the fan exit guide vane; a load member cavity formed within the fan exit guide vane extending spanwise through the fan exit guide vane from the radially inner attachment region to the radially outer attachment region; the load member extending through the load member cavity beyond each of the radially inner attachment region and the radially outer attachment region of the fan exit guide vane; the cooling cavity formed within the fan exit guide vane extending spanwise through the fan exit guide vane between the radially inner attachment region and the radially outer attachment region; and a leading edge deicing structure in fluid communication with the cooling cavity and the leading edge.

A further embodiment of any of the foregoing embodiments may additionally and/or alternatively include the load member being configured to support a load path in tension along the span dimension of the fan exit guide vane between the radially inner attachment region spanwise and the radially outer attachment region; the cooling cavity being configured to support heat transfer from a working fluid to a fan bypass flow; and the leading edge deicing structure is configured to suppress ice formation proximate the leading edge.

A further embodiment of any of the foregoing embodiments may additionally and/or alternatively include the fan exit guide vane with load carrying member and leading edge deicing further comprising a heat exchanger thermally coupled to the cooling cavity and flow passages fluidly coupled between the heat exchanger and the leading edge.

A further embodiment of any of the foregoing embodiments may additionally and/or alternatively include the fan exit guide vane with load carrying member and leading edge deicing further comprising electronics thermally coupled to the cooling cavity and flow passages fluidly coupled between the heat exchanger and the leading edge.

A further embodiment of any of the foregoing embodiments may additionally and/or alternatively include the fan exit guide vane with load carrying member and leading edge deicing further comprising a working fluid pipe thermally coupled to the cooling cavity and flow passages fluidly coupled between the heat exchanger and the leading edge.

A further embodiment of any of the foregoing embodiments may additionally and/or alternatively include the leading edge deicing structure flow passages are fluidly coupled with the load member cavity.

A further embodiment of any of the foregoing embodiments may additionally and/or alternatively include the fan exit guide vane with load carrying member and leading edge deicing further comprising face sheet orifices on a face sheet attached to the pressure side between the leading edge and trailing edge; the face sheet enclosing the cooling cavity.

In accordance with the present disclosure, there is provided a gas turbine engine with a fan exit guide vane with load carrying member and leading edge deicing comprising a fan located within a fan duct; an array of fan exit guide vanes supported within the fan duct downstream from the fan, the array of fan exit guide vanes span across the fan duct attached to a radially inner surface of the fan duct and a radially outer surface of the fan duct; each of the fan exit guide vanes comprising a leading edge and a trailing edge opposite chordwise from the leading edge; a radially inner attachment region opposite spanwise from a radially outer attachment region, the radially inner attachment region in operative communication with the radially inner surface of the fan duct, the radially outer attachment region in operative communication with the radially outer surface of the fan duct; a span dimension extending between the radially inner attachment region and the radially outer attachment region; a chord dimension extending between the leading edge and the trailing edge; a pressure side opposite a suction side of the fan exit guide vane; a load member cavity formed within at least one fan exit guide vane in the array, the load member cavity extending spanwise through the at least one fan exit guide vane from the radially inner attachment region to the radially outer attachment region; the load member extending through the load member cavity beyond each of the radially inner attachment region and the radially outer attachment region of the at least one fan exit guide vane; the load member in operative communication with the radially inner surface and the radially outer surface; the cooling cavity formed within the fan exit guide vane extending spanwise through the fan exit guide vane between the radially inner attachment region and the radially outer attachment region; and a leading edge deicing structure in fluid communication with the cooling cavity and the leading edge.

A further embodiment of any of the foregoing embodiments may additionally and/or alternatively include the load member being configured to support a load path in tension along the span dimension of the at least one fan exit guide vane between the radially inner surface spanwise and the radially outer surface of the fan duct, and the cooling cavity being configured to support heat transfer from a working fluid and/or electronics to a fan bypass flow and the leading edge deicing structure being configured to suppress ice formation proximate the leading edge.

A further embodiment of any of the foregoing embodiments may additionally and/or alternatively include the gas turbine engine with a fan exit guide vane with load carrying member and leading edge deicing further comprising a heat exchanger thermally coupled to the cooling cavity and flow passages fluidly coupled between the heat exchanger and the leading edge.

A further embodiment of any of the foregoing embodiments may additionally and/or alternatively include the gas turbine engine with a fan exit guide vane with load carrying member and leading edge deicing further comprising electronics thermally coupled to the cooling cavity and flow passages fluidly coupled between the heat exchanger and the leading edge.

A further embodiment of any of the foregoing embodiments may additionally and/or alternatively include the gas turbine engine with a fan exit guide vane with load carrying member and leading edge deicing further comprising a working fluid pipe thermally coupled to the cooling cavity and flow passages fluidly coupled between the heat exchanger and the leading edge.

A further embodiment of any of the foregoing embodiments may additionally and/or alternatively include the array of the fan exit guide vane includes at least one of a symmetrically aligned circular pattern of cooling cavity and an asymmetrically aligned circular pattern of cooling cavity; and at least one of a symmetrically aligned circular pattern of leading edge deicing structure and an asymmetrically aligned circular pattern of leading edge deicing structure.

In accordance with the present disclosure, there is provided a process for supporting a structural load path in a gas turbine engine with a fan exit guide vane with load carrying member and leading edge deicing comprising locating a fan within a fan duct; supporting an array of fan exit guide vanes within the fan duct downstream from the fan; attaching the array of fan exit guide vanes spanned across the fan duct to a radially inner surface of the fan duct and a radially outer surface of the fan duct; each of the fan exit guide vanes comprising a leading edge and a trailing edge opposite chordwise from the leading edge; a radially inner attachment region opposite spanwise from a radially outer attachment region; coupling the radially inner attachment region in operative communication with the radially inner surface of the fan duct; coupling the radially outer attachment region in operative communication with the radially outer surface of the fan duct; a span dimension extending between the radially inner attachment region and the radially outer attachment region; a chord dimension extending between the leading edge and the trailing edge; a pressure side opposite a suction side of the fan exit guide vane; forming a load member cavity within at least one fan exit guide vane in the array; extending the load member cavity spanwise through the at least one fan exit guide vane from the radially inner attachment region to the radially outer attachment region; extending the load member through the load member cavity beyond each of the radially inner attachment region and the radially outer attachment region of the at least one fan exit guide vane; coupling the load member in operative communication with the radially inner surface and the radially outer surface; forming the cooling cavity within the fan exit guide vane extending spanwise through the fan exit guide vane between the radially inner attachment region and the radially outer attachment region; and coupling a leading edge deicing structure in fluid communication with the cooling cavity and the leading edge.

A further embodiment of any of the foregoing embodiments may additionally and/or alternatively include the process further comprising configuring the load member to support a load path in tension along the span dimension of the at least one fan exit guide vane between the radially inner surface spanwise and the radially outer surface of the fan duct; configuring the cooling cavity to support heat transfer from a working fluid and/or electronics to a fan bypass flow; and configuring the leading edge deicing structure to suppress ice formation proximate the leading edge.

A further embodiment of any of the foregoing embodiments may additionally and/or alternatively include the process further comprising thermally coupling a heat exchanger to the cooling cavity; and fluidly coupling flow passages between the heat exchanger and the leading edge.

A further embodiment of any of the foregoing embodiments may additionally and/or alternatively include the process further comprising thermally coupling electronics to the cooling cavity; and fluidly coupling flow passages between the electronics and the leading edge.

A further embodiment of any of the foregoing embodiments may additionally and/or alternatively include the process further comprising thermally coupling a working fluid pipe to the cooling cavity; and fluidly coupling flow passages between the working fluid pipe and the leading edge.

A further embodiment of any of the foregoing embodiments may additionally and/or alternatively include the process further comprising inserting the load member within the array of fan exit guide vanes with at least one of a symmetrically aligned circular pattern and an asymmetrically aligned circular pattern; inserting at least one of a heat exchanger, electronics and working fluid pipe within the array of fan exit guide vanes with at least one of a symmetrically aligned circular pattern and an asymmetrically aligned circular pattern; and fluidly coupling the leading edge deicing structure within the array of fan exit guide vanes with at least one of a symmetrically aligned circular pattern and an asymmetrically aligned circular pattern.

A further embodiment of any of the foregoing embodiments may additionally and/or alternatively include the process further comprising enclosing a predetermined volume of the fan exit guide vane for the cooling cavity and the leading edge deicing structure, the predetermined volume of the cooling cavity being greater than a normal volume responsive to the load member accounting for a structural tension load that would otherwise be required to be maintained by material of the fan exit guide vane removed to form the cooling cavity and the leading edge deicing structure.

Other details of the fan exit guide vane with load carrying member and leading edge deicing are set forth in the following detailed description and the accompanying drawings wherein like reference numerals depict like elements.

DETAILED DESCRIPTION

Figure 1:
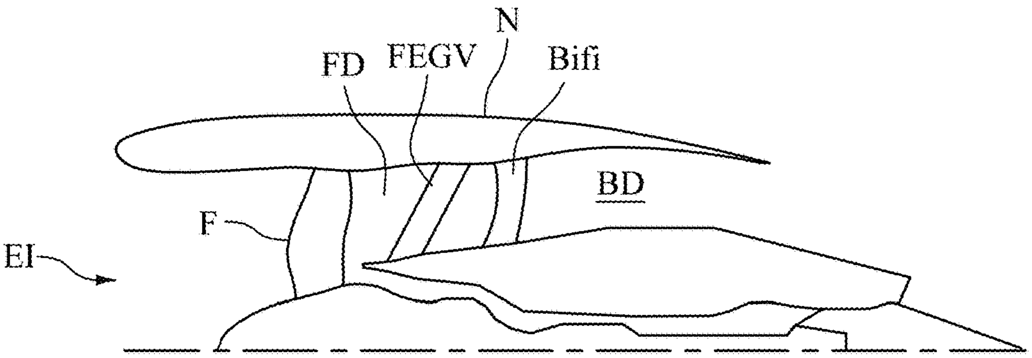
FIG. 1 (PRIOR ART)
FIG. 1 is a schematic representation of a prior art gas turbine engine.
Figure 2:
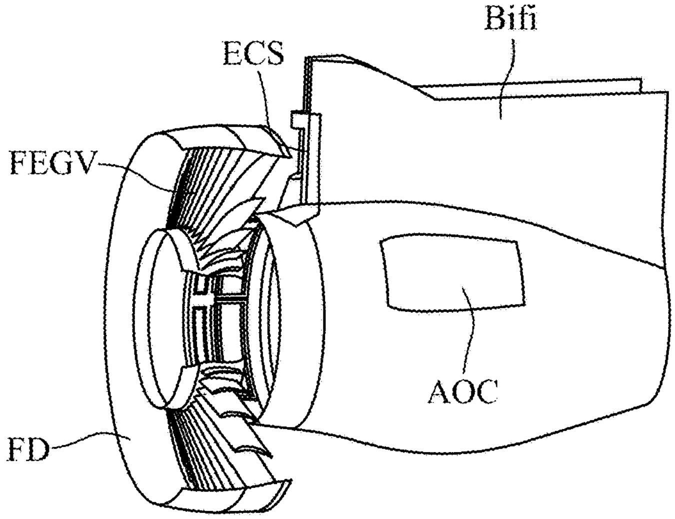
FIG. 2 (PRIOR ART)
FIG. 2 is a schematic representation of a prior art gas turbine engine.
Figure 3:
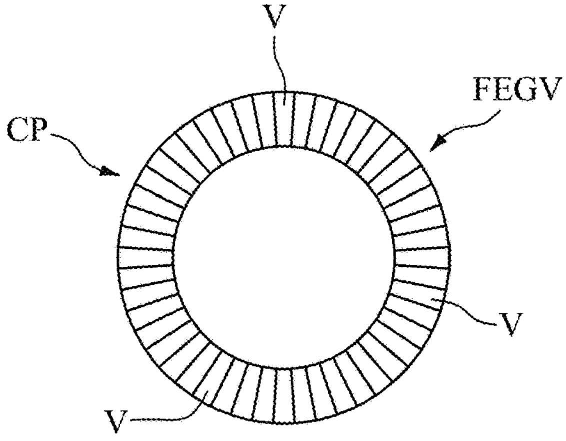
FIG. 3 (PRIOR ART)
FIG. 3 is a schematic representation of a prior art fan exit guide vane pattern.
Figure 4:
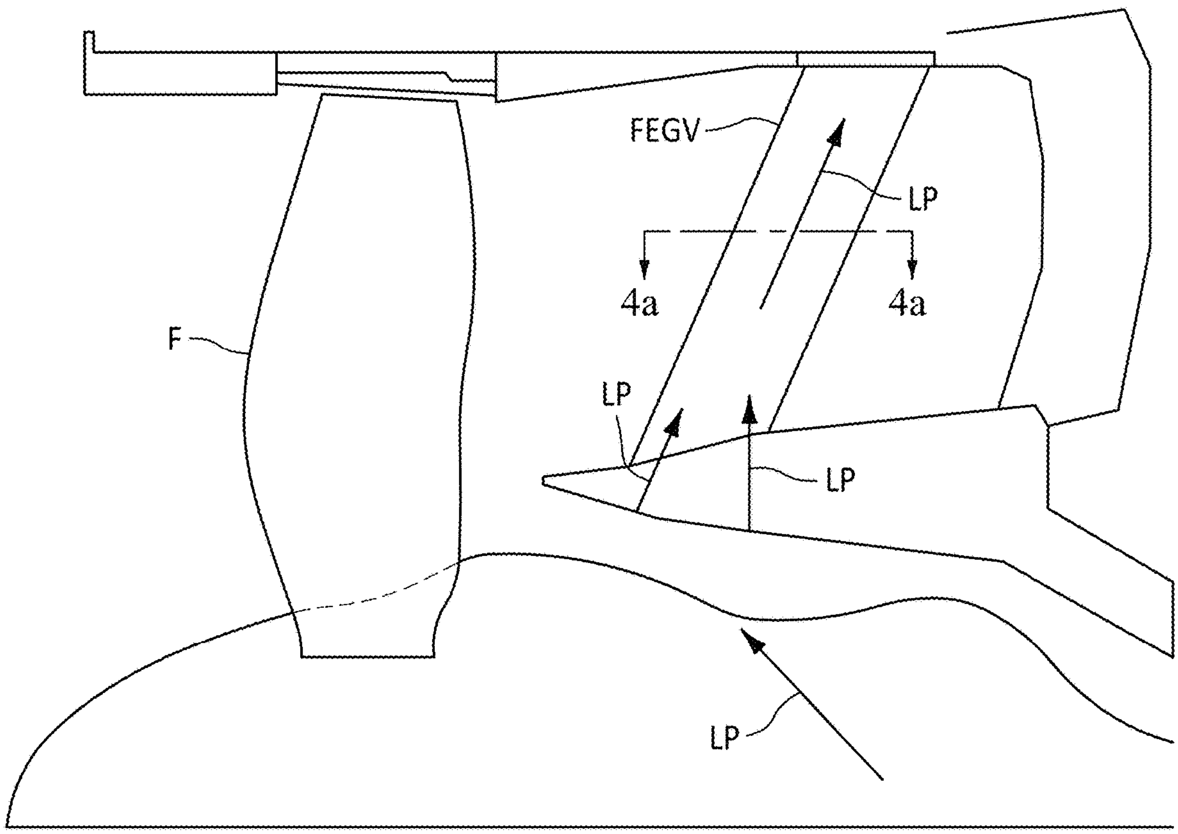
FIG. 4 (PRIOR ART)
FIG. 4 is a schematic representation of a prior art fan exit guide vane with load path.
Figure 4A:
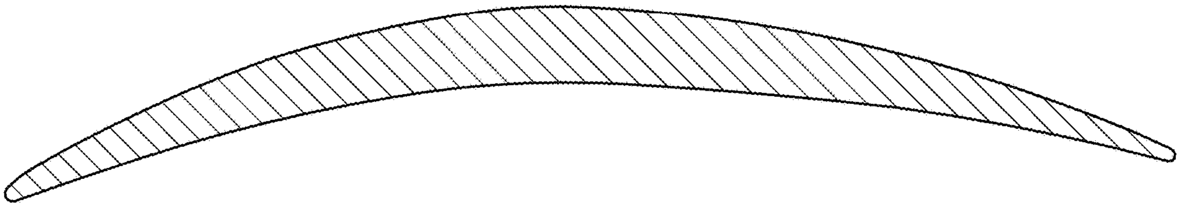
FIG. 4a (PRIOR ART)
FIG. 4A is a sectional view schematic representation of the prior art fan exit guide vane FIG. 4.
Figure 5:
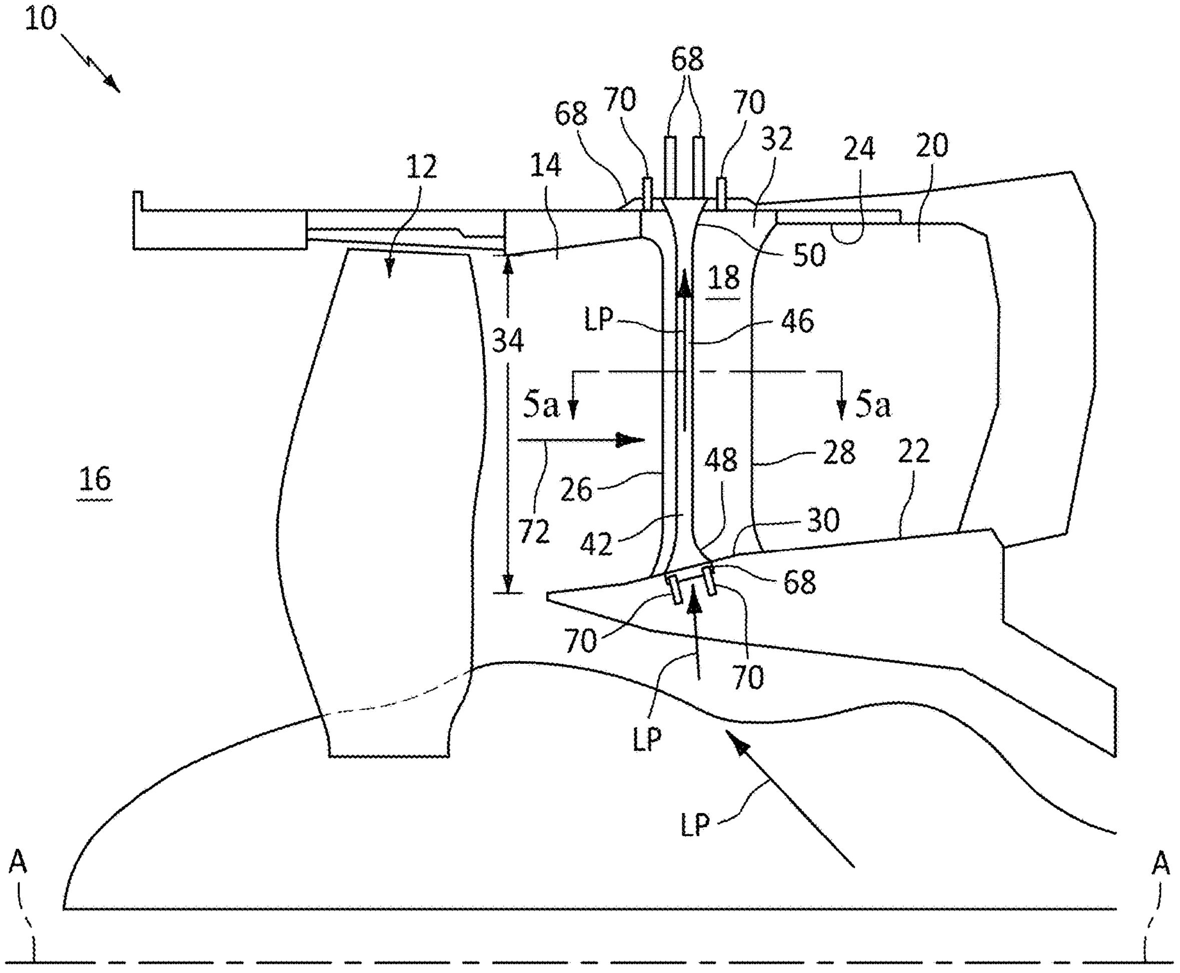
FIG. 5 is a schematic representation of an exemplary fan exit guide vane with load carrying member.

Referring now to FIG. 5 showing a schematic of a gas turbine engine 10. The gas turbine engine 10 includes a fan 12 within a fan duct 14 proximate an engine inlet 16. Downstream from the fan 12 is a fan exit guide vane 18 upstream from a bypass duct 20. There can be an array 62 of fan exit guide vanes 18 arranged circumferentially around the fan duct 20, (see FIG. 8*a*-8*d*). The fan exit guide vane 18 can support a structural load path LP shown as arrows.

The fan exit guide vane 18 spans across the fan duct 14 attached to a radially inner surface 22 of the fan duct 14 and a radially outer surface 24 of the fan duct 14.

Figure 5A:
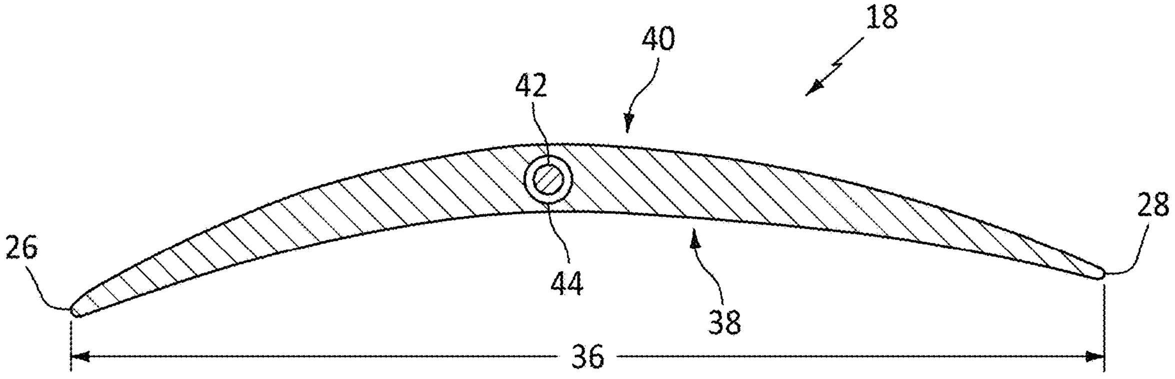
FIG. 5*a* is a sectional view schematic representation of the exemplary fan exit guide vane with load carrying member of FIG. 5.

With reference also to FIG. 5*a*, the fan exit guide vane 18 includes a leading edge 26 and a trailing edge 28 opposite chordwise from the leading edge 26. The fan exit guide vane 18 shown in FIG. 5 is oriented generally vertical, that is along a similar radial span between the radially inner surface 22 and radially outer surface 24 relative to the axis A.

The fan exit guide vane 18 includes a radially inner attachment region 30 proximate the radially inner surface 22. The fan exit guide vane 18 includes a radially outer attachment region 30 proximate the radially outer surface 24. The radially inner attachment region 30 is opposite spanwise from the radially outer attachment region 32. The radially inner attachment region 30 of the fan exit guide vane 18 attaches to the fan duct 14 at the radially inner surface 22. The radially outer attachment region 32 of the fan exit guide vane 18 attaches to the fan duct 14 at the radially outer surface 24.

The fan exit guide vane 18 includes a span 34 dimension extending between the radially inner attachment region 30 and the radially outer attachment region 32. The fan exit guide vane 18 includes a chord dimension 36 extending between the leading edge 26 and the trailing edge 28, as seen in FIG. 5. The fan exit guide vane 18 includes a pressure side 38 opposite a suction side 40, as seen in FIG. 6*a*.

The fan exit guide vane 18 includes a load member 42. The load member 42 extends through a load member cavity 44 extending spanwise through the fan exit guide vane 18. The load member cavity 44 is formed with sufficient size to allow for contact free placement of the load member 42 through the fan exit guide vane 18, as seen in FIG. 5. The load member 42 can extend through the load member cavity 44 past each of the radially inner attachment region 30 and radially outer attachment region 32 of the fan exit guide vane 18.

The load member 42 can include a body 46 with a first end 48 and a second end 50 opposite the first end 48, as seen in FIG. 5. The load member 42 can provide the structural load characteristics needed to support the components within the gas turbine engine 10 in substitute for the fan exit guide vane 18 structure. The load member 42 completes the load path LP of the gas turbine engine 10 that the fan exit guide vane 18 traditionally carried. The load member 42 supports a load in tension along the span dimension 34 of the fan exit guide vane 18 between the radially inner surface 22 and radially outer surface 24. The fan exit guide vane 18 maintains the aerodynamic loads presented within the fan duct 14. The aerodynamic loads are created by the fan exhaust flowing over the pressure side 38 and suction side 40 and other control surfaces of the fan exit guide vane 18, as seen in FIG. 5.

Figure 6:
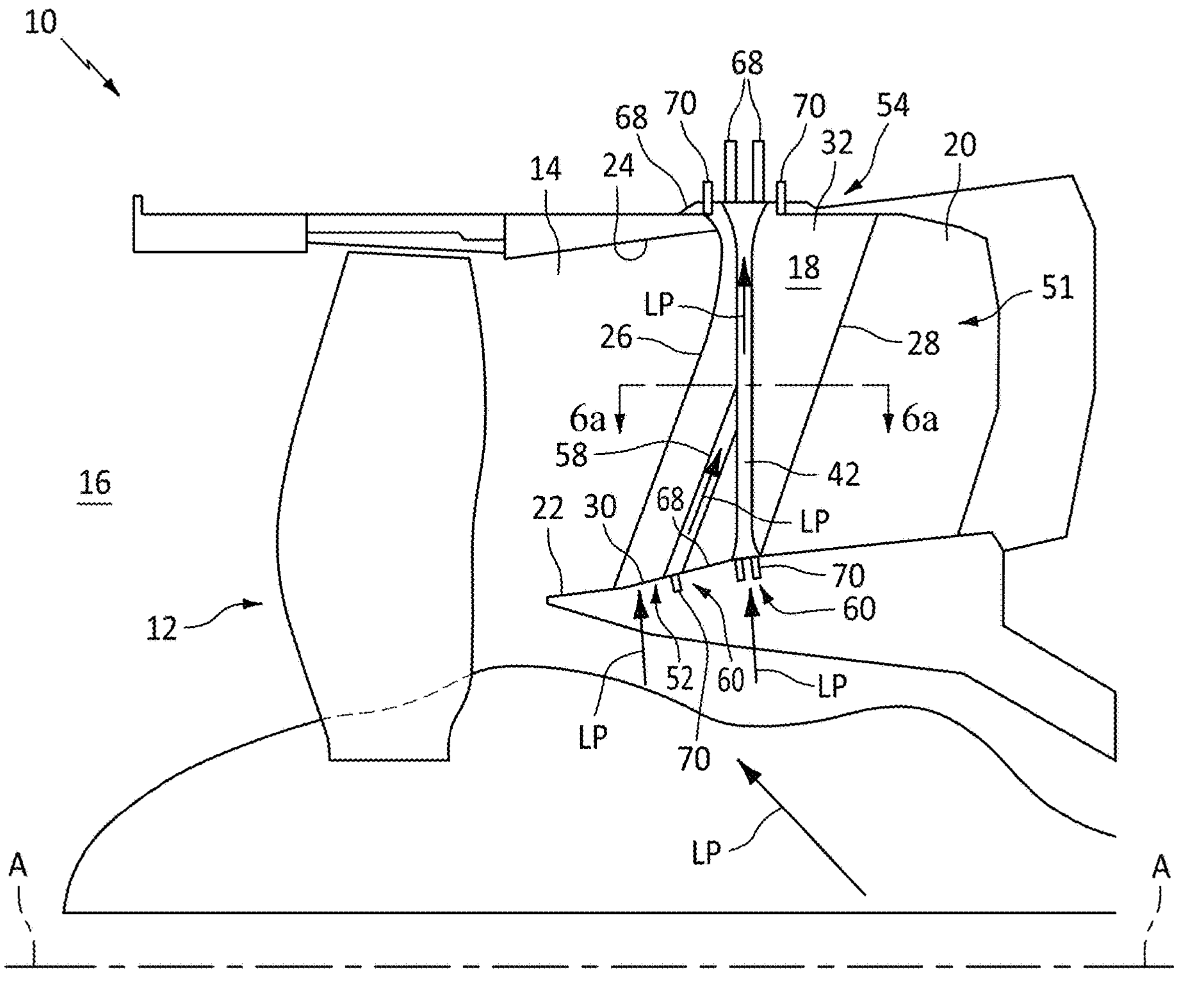
FIG. 6 is a schematic representation of an exemplary fan exit guide vane with load carrying member.
Figure 6A:
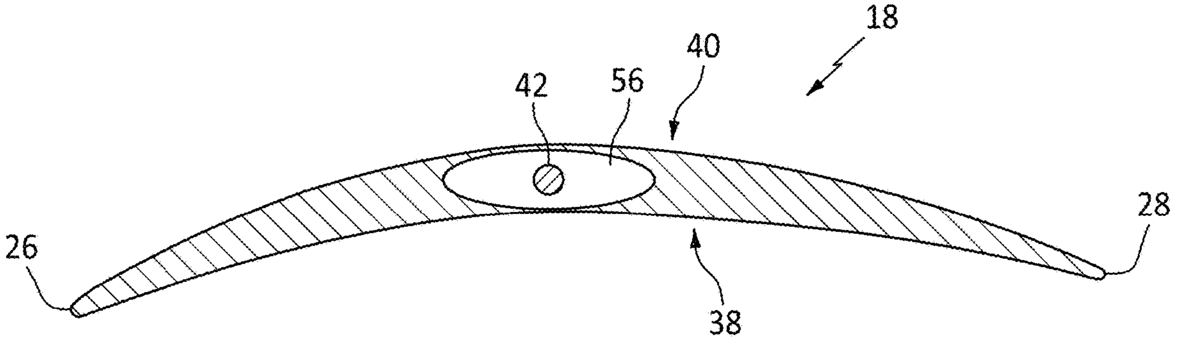
FIG. 6*a* is a sectional view schematic representation of the exemplary fan exit guide vane with load carrying member of FIG. 6.

Referring also to FIG. 6 and FIG. 6*a*, an exemplary fan exit guide vane 18 is also shown. The fan exit guide vane 18 shown in FIG. 6 has an angled vane configuration. The angled vane configuration 51 can be seen with the radially inner attachment region 30 connecting with the radially inner surface 22 at a first axial position 52 that is forward (upstream) of a second axial position 54. The radially outer attachment region 32 connects with the radially outer surface 24 at the second axial position 54 which is aft (downstream) of the location of the attachment between the radially inner attachment region 30 and radially inner surface 22.

The angled vane configuration 51 includes a modified load member cavity 56. The modified load member cavity 56 has a larger volume and wider cutout chordwise to allow for the load member 42 to maintain a relatively radial orientation relative to the gas turbine engine axis A. The load member 42 can carry a tension load across the fan duct 14 substantially radially aligned. In exemplary embodiments, the load member 42 can be oriented as angled from the radial orientation relative to axis A.

As seen in FIG. 6, there can be a modified load member 58 having additional hardware that provides additional attachment points 60 proximate the radially inner attachment region 30 and/or the radially outer attachment region. The embodiment at FIG. 6 shows two such points 60. The modified load member 58 can be utilized to accommodate more complex load carrying arrangements. The load member(s) are packaged within the aerodynamic shroud of the fan exist guide vane (FEGV) providing benefits over the use of fan frames.

Figure 7:
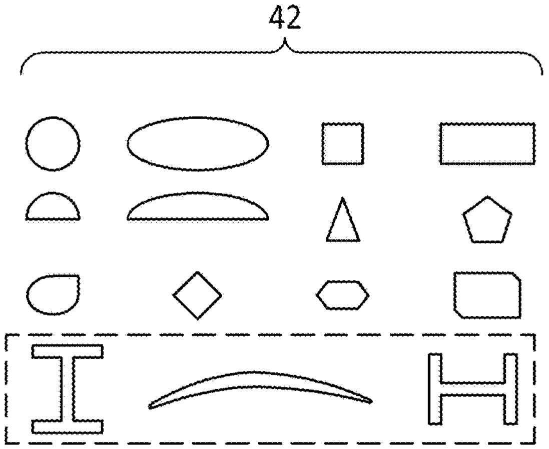
FIG. 7 is a schematic representation of exemplary cross-sections for the load carrying member.
Figure 8A:
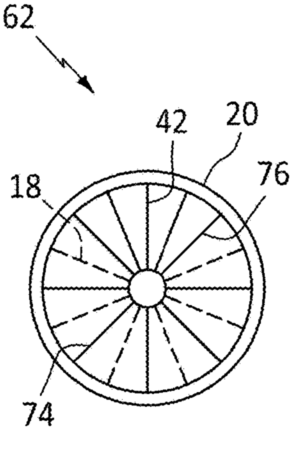
FIGS. 8*a* to 8*d* are aft looking forward view schematic representations of exemplary fan exit guide vane patterns with load carrying members and bypass cooling cavities.
Figure 8B:
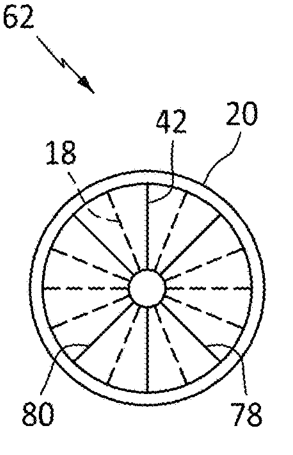
Figure 8C:
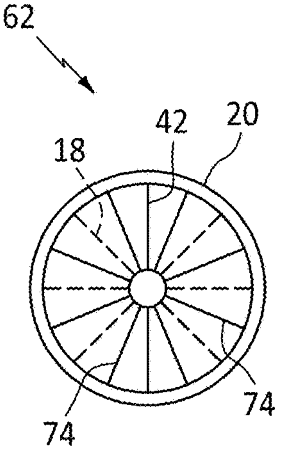
Figure 8D:
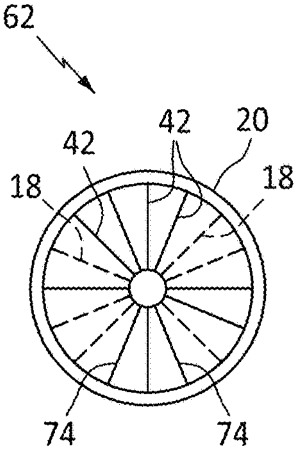
Figure 10:
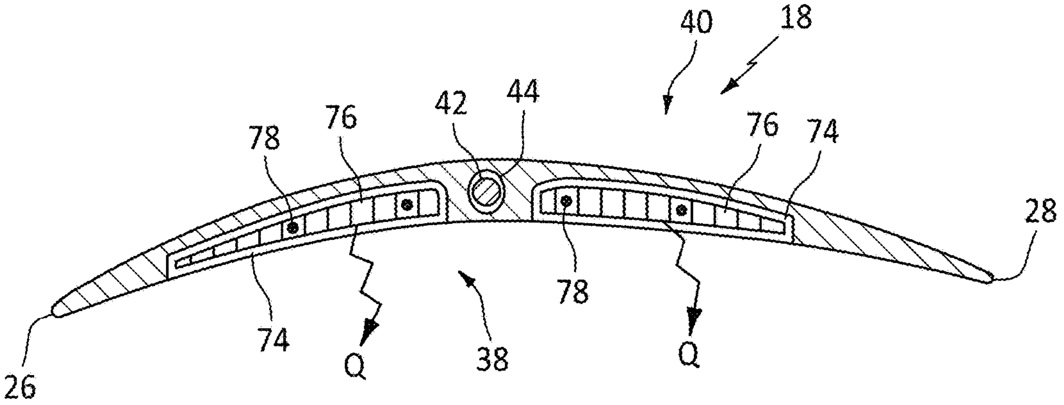
FIG. 10 is a cross-section of FIG. 9 schematic representation of exemplary fan exit guide vane with cooling cavity.
Figure 9:
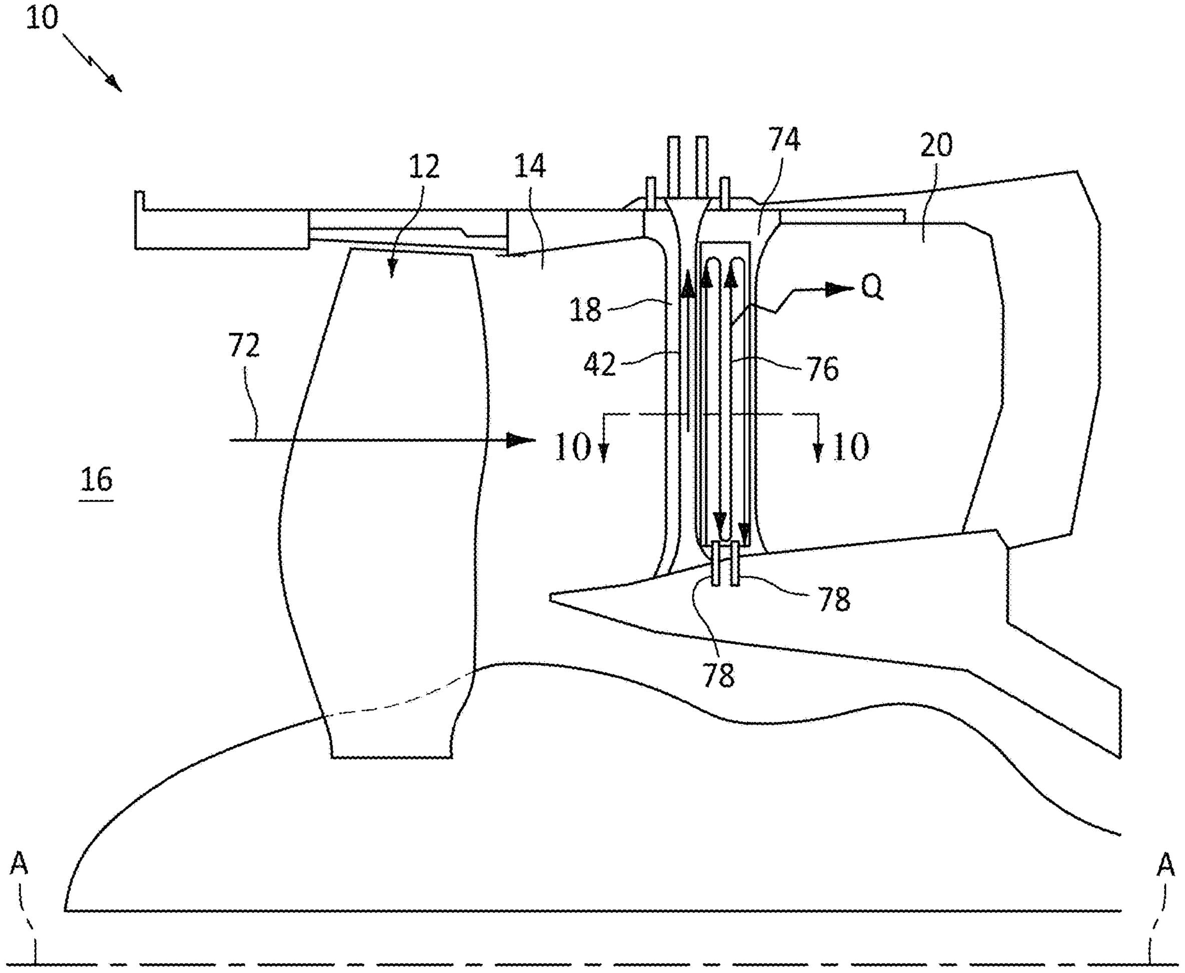
FIG. 9 is a schematic representation of an exemplary fan exit guide vane with load carrying member and heat exchanger.

Also referring to FIG. 7, the load member 42, 58 can be configured with a variety of cross-sectional shapes depending on the particular loads required. The cross-sectional shapes of the load member 42, 58 can include but are not limited to circular, oval, square, rectangular, semi-circle, semi-oval, triangular, pentagonal, polygonal, diamond, I-beam, crescent, H-beam and the like.

Referring also to FIGS. 8*a* to 8*d*, an array 62 of fan exit guide vanes 18 arranged circumferentially around the fan duct 20. The array 62 of fan exit guide vanes 18 can be arranged in a variety of configurations. Some of the fan exit guide vanes 18 can be conventional in the absence of a load member 42, while others can include a load member 42 within the fan exit guide vane 18. The array 62 can have symmetrically aligned circular pattern 64. For example, there can be a load member 42 within every other fan exit guide vane 18 around the array 62. For example, the fan exit guide vanes 18 that are at 12 o'clock, 3 o'clock, 6 o'clock and 9 o'clock can include a load member 42. For example, only the fan exit guide vanes 18 at 2 o'clock, 4 o'clock, 8 o'clock and 10 o'clock do not have a load member 42. Any variety of symmetrically aligned circular patterns 64 can be employed. The array 62 can include a non-symmetrically aligned pattern 66. For example, there can be fan exit guide vanes 18 with load members 42 included in positions relative to the clock face, that are asymmetrical or non-symmetrical. For example, load members 42 included in locations at 10 o'clock, 11 o'clock, 12 o'clock, 1 o'clock, 5 o'clock, 6 o'clock and 7 o'clock. Any variety of non-symmetrically aligned patterns 66 can be employed.

As seen in FIG. 5 and FIG. 6, the fan exit guide vane 18 and/or the load member 42 can be attached to fan duct 14 structural members 68 with fasteners 70 proximate the radially inner attachment region 30 as well as the radially outer attachment region 32. The fan exit guide vane 18 can be fixed or can be an adjustable fan exit guide vane 18 capable of rotating relative to fan bypass flow 72 along the fan duct 14. The fan exit guide vane 18 can also be a split design that allows for rotation of the fan exit guide vane 18 at multiple locations along the span 34.

Referring also to FIG. 9 through FIG. 12, an exemplary fan exit guide vane 18 with a cooling cavity 74 is shown. The fan exit guide vane 18 can include the addition of the cooling cavity 74 proximate the pressure side 38. A heat exchanger 76 can be located in the cooling cavity 74 within the pressure side 38 between the leading edge 26 and trailing edge 28. The cooling cavity 74 can be a relatively large volume of the fan exit guide vane 18 because the load member 42 accounts for the structural tension load that would otherwise be required to be maintained by the material of the fan exit guide vane 18 removed to form the cooling cavity 74. A relatively larger heat exchanger 74 can be mounted within the cooling cavity 74 as opposed to a fan exit guide vane 18 without the load member 42.

Figure 11:
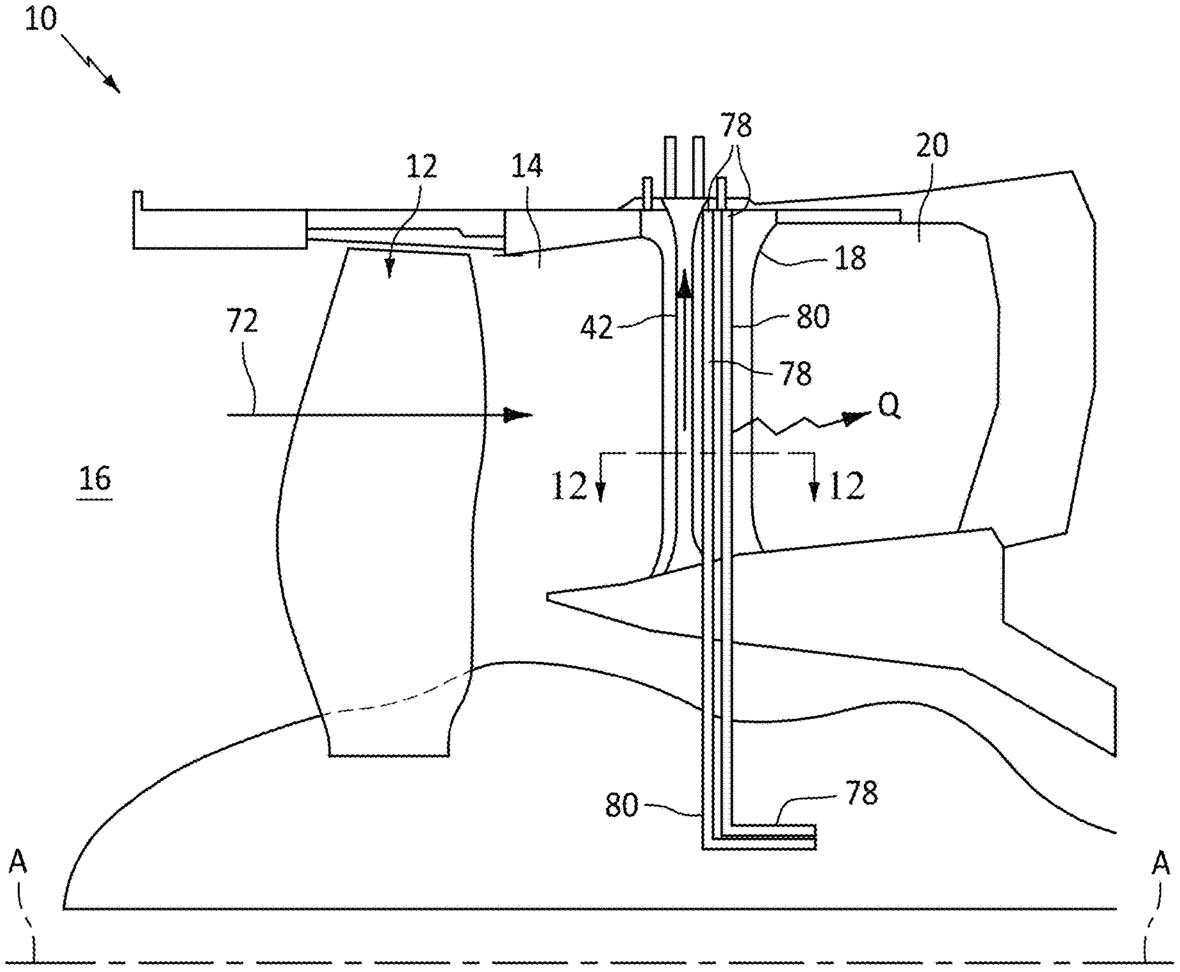
FIG. 11 is a cross-section schematic representation of exemplary fan exit guide vane with cooling cavity.
Figure 12:
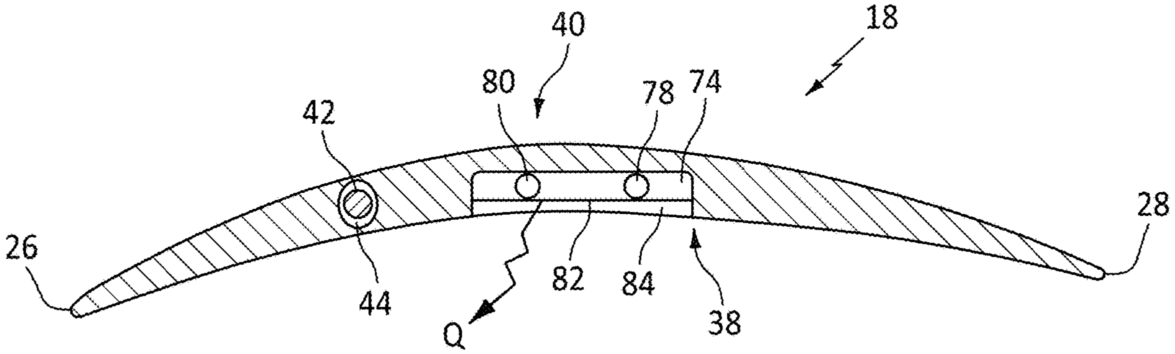
FIG. 12 is a cross-section of FIG. 11 schematic representation of exemplary fan exit guide vane with cooling cavity.
Figure 13:
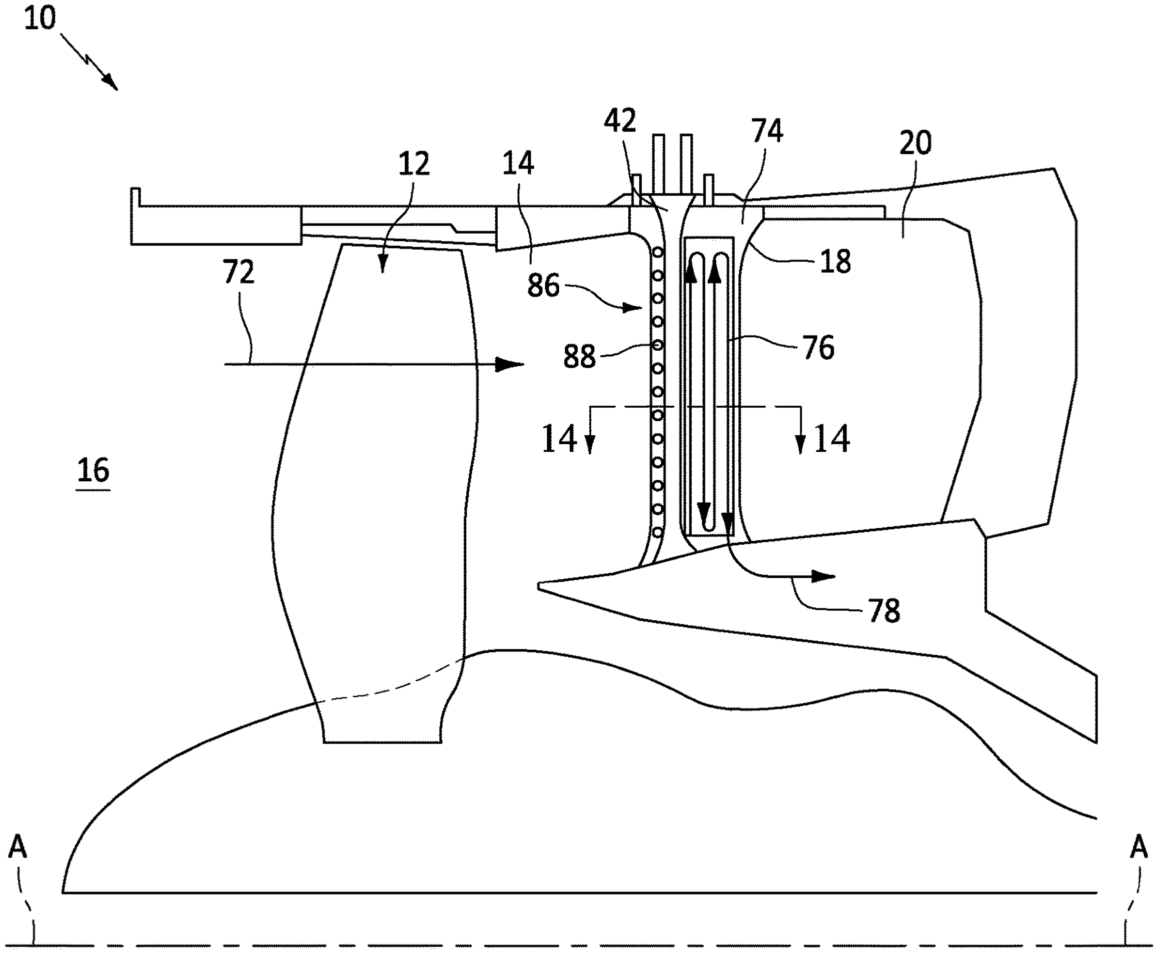
FIG. 13 is a schematic representation of an exemplary fan exit guide vane with load carrying member and heat exchanger and leading edge deicing structure.
Figure 14:
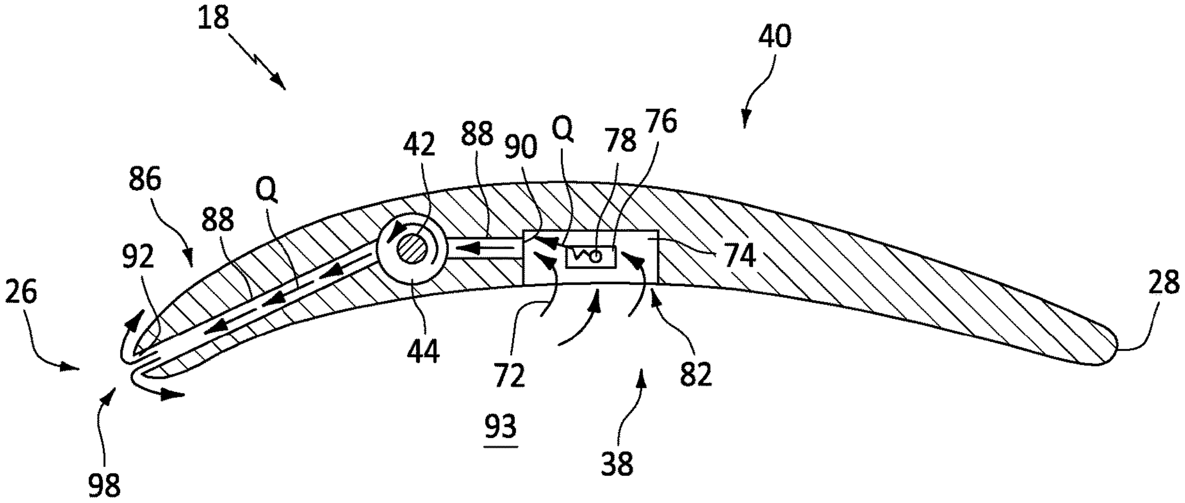
FIG. 14 is a cross-section of FIG. 13 schematic representation of exemplary fan exit guide vane with cooling cavity and leading edge deicing structure.
Figure 15:
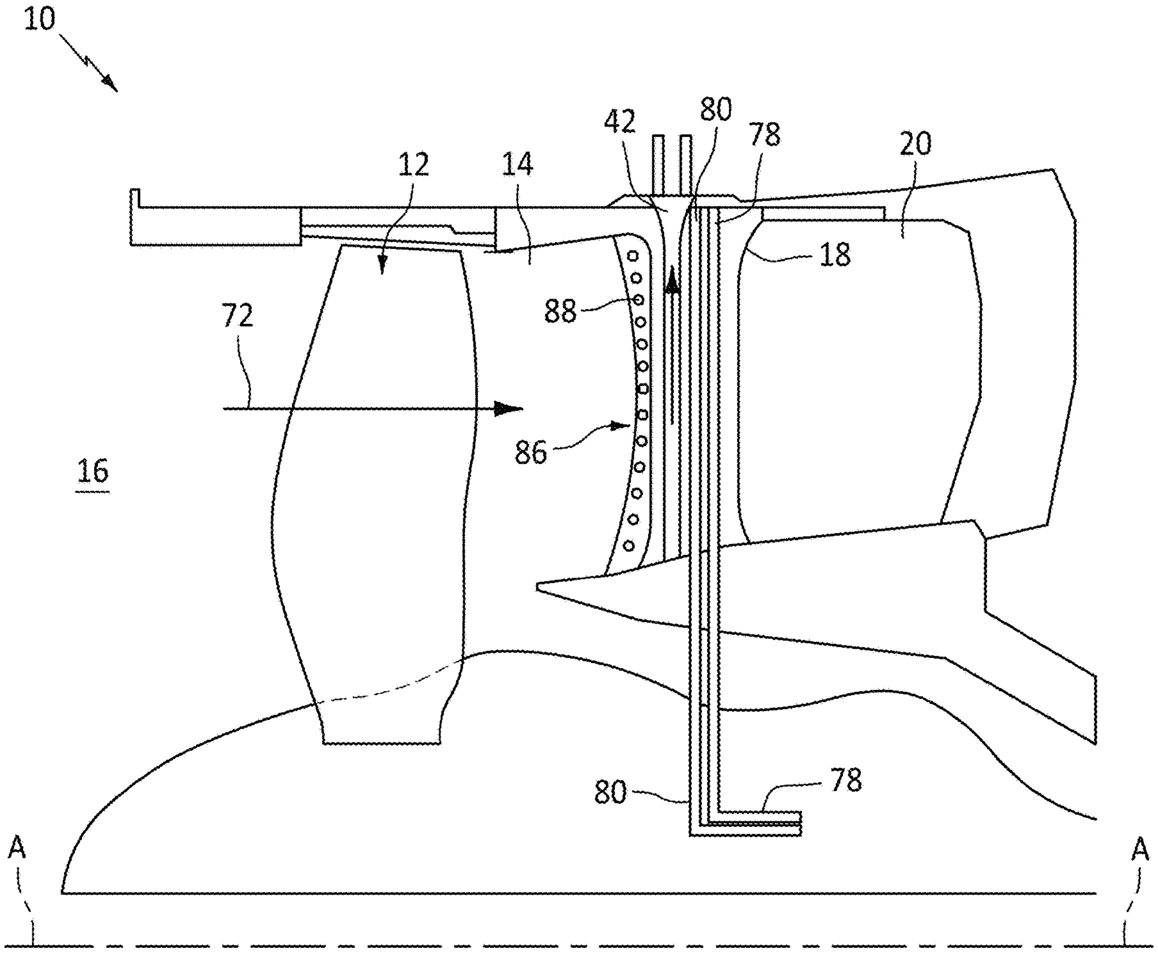
FIG. 15 is a schematic representation of an exemplary fan exit guide vane with load carrying member and leading edge deicing structure.
Figure 16:
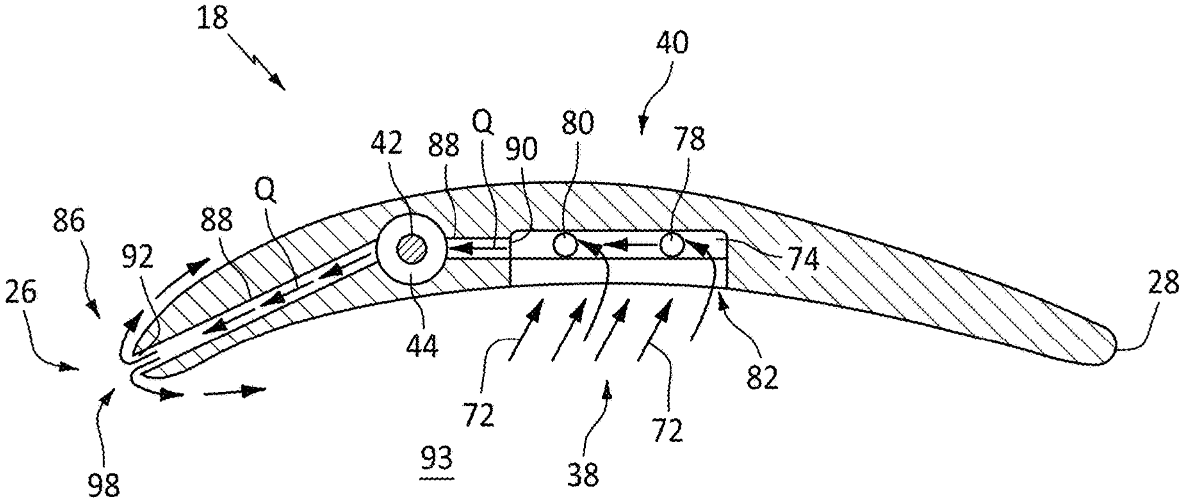
FIG. 16 is a cross-section of FIG. 15 schematic representation of exemplary fan exit guide vane with cooling cavity and leading edge deicing structure.
Figure 17:
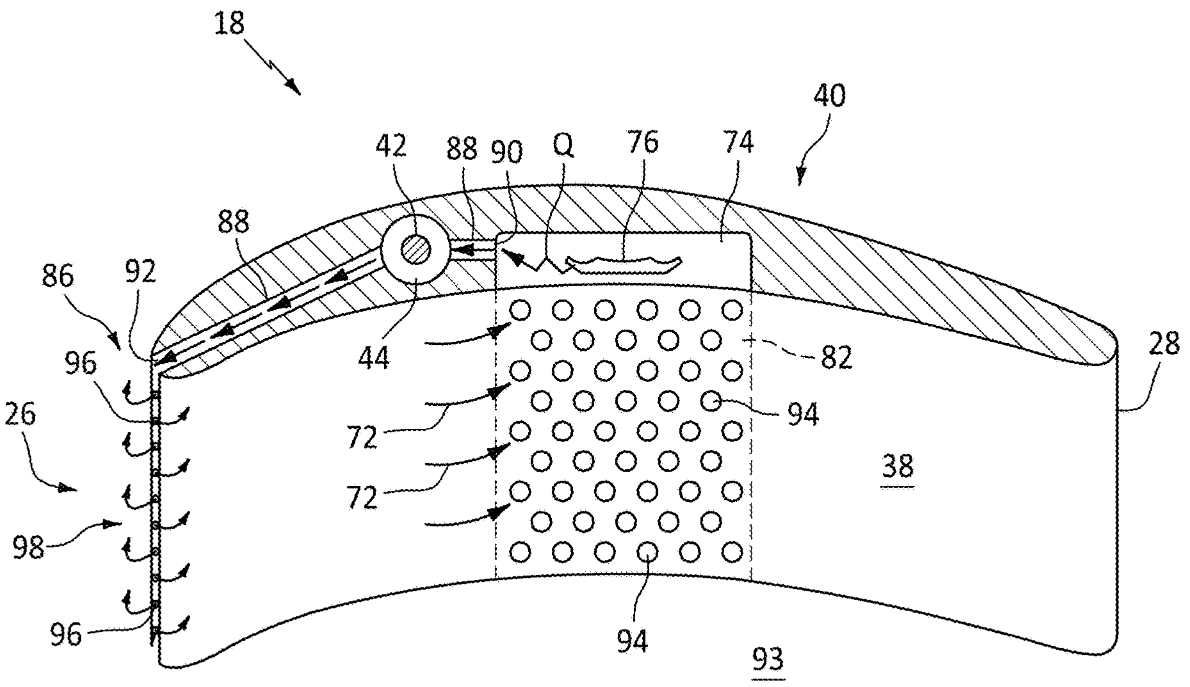
FIG. 17 is a schematic representation of an exemplary fan exit guide vane with load carrying member and heat exchanger and leading edge deicing structure.

As also seen in FIG. 11 and FIG. 12, the cooling cavity 74 can be configured to receive working fluid pipe 78. The working fluid pipe 78 can include an air conduit, oil pipe, compressor bleed air pipe, engine exhaust pipe, and the like. The working fluid pipe 78 can have thermal energy Q that requires thermal management. The working fluids in the pipe 78 can be relatively warmer than the bypass flow 72. Heat transfer can be accomplished between the relatively warmer working fluid 78 and the bypass flow 72. The working fluids 78 can flow through the heat exchanger 76 and transfer thermal energy Q from the heat exchanger 76 to the bypass flow 72. The bypass flow air 72 can be evacuated from the cooling cavity 74.

The cooling cavity 74 can be configured to receive electronics 80. The electronics 80 can include instrumentation and controls, heat sinks, processors, wire harnesses and the like. The electronics 80 can have thermal energy Q that requires thermal management. The electronics 80 can be relatively warmer than the bypass flow 72. Heat transfer can be accomplished between the relatively warmer electronics 80 and the bypass flow 72.

A face sheet 82 can be operatively coupled to the cooling cavity 74 to allow for bypass flow 72 to enter the cooling cavity 74 and pass over the heat exchanger 76, working fluids 78 piping and/or electronics 80. The face sheet 82 can be coupled to the fan exit guide vane 18 proximate the pressure side 38. Acoustic treatment 84 can be in operative communication with the face sheet 82. The acoustic treatment 84 can provide sound modifying qualities, such as dampening sound waves.

Referring again to FIGS. 8*a* to 8*d*, the array 62 can also include the placement of the cooling cavity 74 and associated heat exchanger 76 and/or working fluid piping 78 and/or electronics 80 arranged in various combinations around the circular pattern of the array 62. The array 62 of fan exit guide vanes 18 can be arranged in a variety of configurations for purposes of providing heat transfer. Some of the fan exit guide vanes 18 can be conventional in the absence of a cooling cavity 74, while others can include a cooling cavity 74 within the fan exit guide vane 18. The array 62 can have symmetrically aligned circular pattern 64. For example, there can be a cooling cavity 74 within every other fan exit guide vane 18 around the array 62. For example, the fan exit guide vanes 18 that are at 12 o'clock, 3 o'clock, 6 o'clock and 9 o'clock can include a cooling cavity 74. For example, only the fan exit guide vanes 18 at 2 o'clock, 4 o'clock, 8 o'clock and 10 o'clock do not have a cooling cavity 74. Any variety of symmetrically aligned circular patterns 64 can be employed. The array 62 can include a non-symmetrically aligned pattern 66. For example, there can be fan exit guide vanes 18 with the cooling cavity 74 included in positions relative to the clock face, that are asymmetrical or non-symmetrical. For example, heat exchangers 76 and/or electronics and/or working fluid pipe 78 can be included in locations at 10 o'clock, 11 o'clock, 12 o'clock, 1 o'clock, 5 o'clock, 6 o'clock and 7 o'clock. Any variety of non-symmetrically aligned patterns 66 can be employed.

Referring also to FIG. 13 through FIG. 17, exemplary fan exit guide vane 18 is shown with a leading edge deicing structure 86. The leading edge deicing structure 86 is in fluid communication with the cooling cavity 74 and the leading edge 26. The leading edge deicing structure 86 can include flow passages 88 fluidly coupled between the cooling cavity 74 and the leading edge 26. The flow passages 88 can include inlet 90 and outlet 92. The inlet 90 is in fluid communication with the cooling cavity 74 and configured to receive warmed bypass flow air 72 from the cooling cavity 74. The bypass flow 72 enters from an exterior 93 of the fan exit guide vane 18 through face sheet orifices 94 (seen in FIG. 17) formed in the face sheet 82. The bypass flow air 72 passes across at least one of the heat exchanger 76 shown in FIG. 13 and FIG. 14, working fluid pipe 78 shown in FIG. 15 and FIG. 16, and electronics 80 shown in FIG. 15 and FIG. 16 and is warmed gaining thermal energy Q from the heat exchanger 76, working fluid pipe 78 or electronics 80.

The warmed bypass flow air 72 enters the inlet 90 and flows through the flow passages 88. In an exemplary embodiment, the air 72 can pass through the load member cavity 44 and continue to the outlet 92 proximate the leading edge 26. The outlet 92 can include separate exit holes/slots 96 formed in the leading edge 26. The exit holes/slots 96 produce a film heating layer 98. The film heating layer 98 at the leading edge 26 prevents the formation of ice by providing a warm boundary layer of air that prevents ice formation.

As with the embodiments shown and described in association with FIGS. 8*a*-8*d*, the fan exit guide vanes 18 assembled about the array 62 can employ the leading edge deicing structure 86 to prevent icing events proximate the fan exit guide vanes 18. The leading edge deicing structure 86 can be employed in all of the fan exit guide vanes 18 in the array 62. In an alternative embodiment, the leading edge deicing structure 86 can be employed symmetrically about the array 62 or asymmetrically.

A technical advantage of the disclosed fan exit guide vane with load carrying member and leading edge deicing includes allowing for a dedicated tension load carrying element with the fan exit guide vane.

Another technical advantage of the disclosed fan exit guide vane with load carrying member and leading edge deicing includes allowing for additional space within the fan exit guide vane envelope to accommodate additional design features, such as heat exchangers and leading edge deicing structure.

Another technical advantage of the disclosed fan exit guide vane with load carrying member and leading edge deicing includes additional heat exchangers in fan duct.

Another technical advantage of the disclosed fan exit guide vane with load carrying member and leading edge deicing includes decoupling the aerodynamic load capacity from the structural load capacity of the fan exit guide vane.

Another technical advantage of the disclosed fan exit guide vane with load carrying member and leading edge deicing includes the capacity to customize the load carrying arrangement and/or the heat transfer/deicing arrangement around the array of fan exit guide vanes.

Another technical advantage of the disclosed fan exit guide vane with load carrying member and leading edge deicing includes having the capacity to prevent unwanted ice buildup on the fan exit guide vanes.

There has been provided a fan exit guide vane with load carrying member and leading edge deicing. While the fan exit guide vane with load carrying member and cooling cavities has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A fan exit guide vane with load carrying member and leading edge deicing comprising:

a leading edge and a trailing edge opposite chordwise from the leading edge; a radially inner attachment region opposite spanwise from a radially outer attachment region; a span dimension extending between the radially inner attachment region and the radially outer attachment region; a chord dimension extending between the leading edge and the trailing edge; a pressure side opposite a suction side of the fan exit guide vane;

a load member cavity formed within the fan exit guide vane extending spanwise through the fan exit guide vane from the radially inner attachment region to the radially outer attachment region;

the load member extending through the load member cavity beyond each of the radially inner attachment region and the radially outer attachment region of the fan exit guide vane;

a cooling cavity formed within the fan exit guide vane extending spanwise through the fan exit guide vane between the radially inner attachment region and the radially outer attachment region;

a leading edge deicing structure in fluid communication with the cooling cavity and the leading edge; and at least one leading edge deicing structure flow passage is fluidly coupled with the load member cavity.

2. The fan exit guide vane with load carrying member and leading edge deicing according to claim 1, wherein the load member being configured to support a load path in tension along the span dimension of the fan exit guide vane between the radially inner attachment region spanwise and the radially outer attachment region; the cooling cavity being configured to support heat transfer from a working fluid to a fan bypass flow; and the leading edge deicing structure is configured to suppress ice formation proximate the leading edge.

3. The fan exit guide vane with load carrying member and leading edge deicing according to claim 1, further comprising:

a heat exchanger thermally coupled to the cooling cavity and flow passages fluidly coupled between the heat exchanger and the leading edge.

4. The fan exit guide vane with load carrying member and leading edge deicing according to claim 1, further comprising:

electronics thermally coupled to the cooling cavity and flow passages fluidly coupled between the heat exchanger and the leading edge.

5. The fan exit guide vane with load carrying member and leading edge deicing according to claim 1, further comprising:

a working fluid pipe thermally coupled to the cooling cavity and flow passages fluidly coupled between the heat exchanger and the leading edge.

6. The fan exit guide vane with load carrying member and leading edge deicing according to claim 1, further comprising:

face sheet orifices on a face sheet attached to the pressure side between the leading edge and trailing edge; the face sheet enclosing the cooling cavity.

7. A gas turbine engine with a fan exit guide vane with load carrying member and leading edge deicing comprising:

a fan located within a fan duct;

an array of fan exit guide vanes supported within the fan duct downstream from the fan, the array of fan exit guide vanes span across the fan duct attached to a radially inner surface of the fan duct and a radially outer surface of the fan duct;

each of the fan exit guide vanes comprising a leading edge and a trailing edge opposite chordwise from the leading edge; a radially inner attachment region opposite spanwise from a radially outer attachment region, the radially inner attachment region in operative communication with the radially inner surface of the fan duct, the radially outer attachment region in operative communication with the radially outer surface of the fan duct; a span dimension extending between the radially inner attachment region and the radially outer attachment region; a chord dimension extending between the leading edge and the trailing edge; a pressure side opposite a suction side of the fan exit guide vane;

a load member cavity formed within at least one fan exit guide vane in the array, the load member cavity extending spanwise through the at least one fan exit guide vane from the radially inner attachment region to the radially outer attachment region;

the load member extending through the load member cavity beyond each of the radially inner attachment region and the radially outer attachment region of the at least one fan exit guide vane; the load member in operative communication with the radially inner surface and the radially outer surface;

the cooling cavity formed within the fan exit guide vane extending spanwise through the fan exit guide vane between the radially inner attachment region and the radially outer attachment region;

a leading edge deicing structure in fluid communication with the cooling cavity and the leading edge; and at least one leading edge deicing structure flow passage is fluidly coupled with the load member cavity.

8. The gas turbine engine with a fan exit guide vane with load carrying member and leading edge deicing according to claim 7, wherein the load member being configured to support a load path in tension along the span dimension of the at least one fan exit guide vane between the radially inner surface spanwise and the radially outer surface of the fan duct, and the cooling cavity being configured to support heat transfer from a working fluid and/or electronics to a fan bypass flow and the leading edge deicing structure being configured to suppress ice formation proximate the leading edge.

9. The gas turbine engine with a fan exit guide vane with load carrying member and leading edge deicing according to claim 7, further comprising:

a heat exchanger thermally coupled to the cooling cavity and flow passages fluidly coupled between the heat exchanger and the leading edge.

10. The gas turbine engine with a fan exit guide vane with load carrying member and leading edge deicing according to claim 7, further comprising:

electronics thermally coupled to the cooling cavity and flow passages fluidly coupled between the heat exchanger and the leading edge.

11. The gas turbine engine with a fan exit guide vane with load carrying member and leading edge deicing according to claim 7, further comprising:

a working fluid pipe thermally coupled to the cooling cavity and flow passages fluidly coupled between the heat exchanger and the leading edge.

12. The gas turbine engine with a fan exit guide vane with load carrying member and leading edge deicing according to claim 7, wherein the array of the fan exit guide vane includes at least one of a symmetrically aligned circular pattern of cooling cavity and an asymmetrically aligned circular pattern of cooling cavity; and at least one of a symmetrically aligned circular pattern of leading edge deicing structure and an asymmetrically aligned circular pattern of leading edge deicing structure.

13. A process for supporting a structural load path in a gas turbine engine with a fan exit guide vane with load carrying member and leading edge deicing comprising:

locating a fan within a fan duct;

supporting an array of fan exit guide vanes within the fan duct downstream from the fan;

attaching the array of fan exit guide vanes spanned across the fan duct to a radially inner surface of the fan duct and a radially outer surface of the fan duct;

each of the fan exit guide vanes comprising a leading edge and a trailing edge opposite chordwise from the leading edge; a radially inner attachment region opposite spanwise from a radially outer attachment region;

coupling the radially inner attachment region in operative communication with the radially inner surface of the fan duct;

coupling the radially outer attachment region in operative communication with the radially outer surface of the fan duct;

a span dimension extending between the radially inner attachment region and the radially outer attachment region; a chord dimension extending between the leading edge and the trailing edge; a pressure side opposite a suction side of the fan exit guide vane;

forming a load member cavity within at least one fan exit guide vane in the array;

extending the load member cavity spanwise through the at least one fan exit guide vane from the radially inner attachment region to the radially outer attachment region;

extending the load member through the load member cavity beyond each of the radially inner attachment region and the radially outer attachment region of the at least one fan exit guide vane;

coupling the load member in operative communication with the radially inner surface and the radially outer surface;

forming the cooling cavity within the fan exit guide vane extending spanwise through the fan exit guide vane between the radially inner attachment region and the radially outer attachment region;

coupling a leading edge deicing structure in fluid communication with the cooling cavity and the leading edge; and fluidly coupling at least one leading edge deicing structure flow passage with the load member cavity.

14. The process of claim 13, further comprising:

configuring the load member to support a load path in tension along the span dimension of the at least one fan exit guide vane between the radially inner surface spanwise and the radially outer surface of the fan duct;

configuring the cooling cavity to support heat transfer from a working fluid and/or electronics to a fan bypass flow; and configuring the leading edge deicing structure to suppress ice formation proximate the leading edge.

15. The process of claim 13, further comprising:

thermally coupling a heat exchanger to the cooling cavity; and fluidly coupling flow passages between the heat exchanger and the leading edge.

16. The process of claim 13, further comprising:

thermally coupling electronics to the cooling cavity; and fluidly coupling flow passages between the electronics and the leading edge.

17. The process of claim 13, further comprising:

thermally coupling a working fluid pipe to the cooling cavity; and fluidly coupling flow passages between the working fluid pipe and the leading edge.

18. The process of claim 13, further comprising:

inserting the load member within the array of fan exit guide vanes with at least one of a symmetrically aligned circular pattern and an asymmetrically aligned circular pattern;

inserting at least one of a heat exchanger, electronics and working fluid pipe within the array of fan exit guide vanes with at least one of a symmetrically aligned circular pattern and an asymmetrically aligned circular pattern; and fluidly coupling the leading edge deicing structure within the array of fan exit guide vanes with at least one of a symmetrically aligned circular pattern and an asymmetrically aligned circular pattern.

19. The process of claim 13, further comprising:

enclosing a predetermined volume of the fan exit guide vane for the cooling cavity and the leading edge deicing structure, the predetermined volume of the cooling cavity being greater than a normal volume responsive to the load member accounting for a structural tension load that would otherwise be required to be maintained by material of the fan exit guide vane removed to form the cooling cavity and the leading edge deicing structure.

* * * * *